US008117589B2

(12) United States Patent
Christensen et al.

(10) Patent No.: US 8,117,589 B2

(45) Date of Patent: Feb. 14, 2012

(54) METADATA DRIVEN API DEVELOPMENT

(75) Inventors: Erik B. Christensen, Shoreline, WA (US); Michael J. Coulson, Clyde Hill, WA (US); Vaithialingam B. Balayoghan, Bellevue, WA (US); Sermet Iskin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 12/146,462

(22) Filed: Jun. 26, 2008

(65) Prior Publication Data

US 2009/0327994 A1 Dec. 31, 2009

(51) Int. Cl.
*G06F 9/44* (2006.01)

(52) U.S. Cl. ........ 717/106; 717/123; 717/124; 717/128; 717/140; 719/328

(58) Field of Classification Search ........................ None
See application file for complete search history.

(56) References Cited

U.S. PATENT DOCUMENTS

| | | | | |
|---|---|---|---|---|
| 6,195,694 | B1 * | 2/2001 | Chen et al. | 709/220 |
| 7,024,660 | B2 * | 4/2006 | Andrade et al. | 717/124 |
| 7,043,532 | B1 * | 5/2006 | Humpleman et al. | 709/208 |
| 7,165,239 | B2 * | 1/2007 | Hejlsberg et al. | 717/114 |
| 7,325,252 | B2 * | 1/2008 | Bunker et al. | 726/25 |
| 7,548,946 | B1 * | 6/2009 | Saulpaugh et al. | 709/203 |
| 7,627,853 | B2 * | 12/2009 | Ibert et al. | 717/108 |
| 7,796,014 | B2 * | 9/2010 | Traub et al. | 340/10.1 |
| 2002/0095661 | A1 * | 7/2002 | Angel et al. | 717/130 |
| 2003/0056116 | A1 * | 3/2003 | Bunker et al. | 713/201 |
| 2003/0192032 | A1 * | 10/2003 | Andrade et al. | 717/124 |
| 2003/0226131 | A1 | 12/2003 | Li | |
| 2005/0081189 | A1 | 4/2005 | Krasikov et al. | |
| 2005/0193266 | A1 | 9/2005 | Subramanian et al. | |
| 2005/0204367 | A1 | 9/2005 | Minium et al. | |
| 2006/0020643 | A1 | 1/2006 | Locke et al. | |
| 2006/0200486 | A1 | 9/2006 | Castro et al. | |
| 2007/0124334 | A1 | 5/2007 | Pepin | |
| 2007/0220497 | A1 * | 9/2007 | Chudukatil et al. | 717/140 |
| 2007/0226617 | A1 * | 9/2007 | Traub et al. | 715/700 |
| 2007/0233823 | A1 * | 10/2007 | Traub et al. | 709/220 |
| 2009/0158261 | A1 * | 6/2009 | Gielniak et al. | 717/147 |

OTHER PUBLICATIONS

XWRAP: An XML-enabled Wrapper Construction System for Web Information Sources, author: Liu et al, source: IEEE, dated: Feb. 29, 2000.*
Enterprise wrappers for information assurance, author: feldman, M, source: IEEE, dated: Apr. 22, 2004.*
Improving software reliability and productivity via mining program source code, author: Tao Xie. source: IEEE, dated: Apr. 14, 2008.*

(Continued)

*Primary Examiner* — Chameli Das
(74) *Attorney, Agent, or Firm* — Zete Law, P.L.L.C.; MacLane C. Key

(57) ABSTRACT

The described method and system synchronizes source code with byproducts or artifacts of an application creation process. In one embodiment, a generation tool may be used to produce source code header files based on a design specification, where the source code header files are compiled with a current version of source code. Compilation errors may direct a developer to modify either the specification or the source code to eliminate the errors. The described method and system may be integrated into a development platform that is adapted to direct the user to perform particular revisions or updates to bring the source code in line with the artifacts.

20 Claims, 15 Drawing Sheets

OTHER PUBLICATIONS

Behringer, Adam, “Easy Code Documentation with Xcode”, Date: Aug. 27, 2004, 6 Pages, http://www.macdevcenter.com/pub/a/mac/2004/08/27/cocoa.html.

Bell, Peter, “Application Generation”, Date: Dec. 14, 2006, 4 Pages, http://www.pbell.com/index.cfm/2006/12/14/A-Generalized-Approach-to-Application-Generation.

“Generating Documentation”, 7 Pages, http://www.mono-project.com/Generating_Documentation, Dated: Jan. 15, 2008.

* cited by examiner

701

702

```
<Api>

  <Group name='Channel'>
    <Summary>
      <p>
        Channels are used to send and receive Messages.
        A Channel encapsulates a communication context between two or more parties.
      </p>
      <p>
        On the client, use <a href='WsCreateChannel'/> to create a channel.  On the server, use
        <a href='WsCreateChannelForListener'/> to create a channel that can be accepted using a
<a href='Listener'/>.
      </p>
      <p>
        The <a href='WS_CHANNEL_TYPE'/> of a channel specifies the message exchange
        pattern of the channel.
      </p>

        •
        •
        •

    </Summary>
  </Group>
```

```xml
- <Function name="WsCreateChannel" type="HRESULT" group="Channel" trace="WS_TRACE_API_CREATE_CHANNEL">
  - <Summary>
      <p>Create a channel used to initiate a message exchange to some endpoint.</p>
    </Summary>
  - <Remarks>
    - <p>
        Use
        <a href="WsOpenChannel" />
        to initiate the communication with an endpoint.
      </p>
    </Remarks>
  - <Parameter type="WS_CHANNEL_TYPE" name="channelType" dir="in">
    - <Doc>
        <p>The message exchange pattern of the channel.</p>
      </Doc>
    </Parameter>
  - <Parameter type="WS_CHANNEL_BINDING" name="channelBinding" dir="in">
    - <Doc>
        <p>The protocol used by the channel.</p>
      </Doc>
    </Parameter>
  - <Parameter type="const WS_CHANNEL_PROPERTY*" name="properties" dir="in" optional="true" href="WS_CHANNEL_PROPERTY" inLength="propertyCount">
    - <Doc>
      - <p>An optional set of settings used to initialize the channel. This may be NULL if propertyCount is 0.</p>
      - <p>
          See the description of a specific property in
          <a href="WS_CHANNEL_PROPERTY_ID" />
          to see if it can be specified when creating a channel.
        </p>
      - <p>
          When creating a custom channel (using
          <a href="WS_CUSTOM_CHANNEL_BINDING" />
          ), only the following channel properties may be specified:
        </p>
      - <ul>
        - <li />
          <a href="WS_CHANNEL_PROPERTY_CUSTOM_CHANNEL_CALLBACKS" />
        - <li />
          <a href="WS_CHANNEL_PROPERTY_CUSTOM_CHANNEL_PARAMETERS" />
        </ul>
      - <p>
          If initial properties are required to create the custom channel, they should be specified using the
          <a href="WS_CHANNEL_PROPERTY_CUSTOM_CHANNEL_PARAMETERS" />
          property.
        </p>
      </Doc>
    </Parameter>
```

Figure 7B

```
- <Function name="WsCreateChannel" type="HRESULT" group="Channel" trace="WS_TRACE_API_CREATE_CHANNEL">
  - <Parameter type="ULONG" dir="in" name="propertyCount">
    - <Doc>
        <p>The number of items in the properties array.</p>
      </Doc>
    </Parameter>
  - <Parameter type="const WS_SECURITY_DESCRIPTION*" name="securityDescription" dir="in" optional="true" href="Security Description">
    - <Doc>
        <p>A description of the security required for this channel.</p>
      - <p>
          When creating a custom channel (using
          <a href="WS_CUSTOM_CHANNEL_BINDING" />
          ), the security description must be NULL. Security information can be passed to the custom channel implementation using the
          <a href="WS_CHANNEL_PROPERTY_CUSTOM_CHANNEL_PARAMETERS" />
          property.
        </p>
      </Doc>
    </Parameter>
  - <Parameter type="WS_CHANNEL**" dir="out" name="channel">
    - <Doc>
      - <p>
          Upon success of the function, contains the newly allocated channel. The channel should be freed using
          <a href="WsFreeChannel" />
          .
        </p>
      </Doc>
    </Parameter>
  - <Parameter type="WS_ERROR*" dir="in" optional="true" name="error">
    - <Doc>
        <p>Specifies where additional error information should be stored if the function fails.</p>
      </Doc>
    </Parameter>
    <Error name="E_INVALIDARG" />
    <Error name="E_OUTOFMEMORY" />
    <OtherErrors />
  </Function>
```

What appears in the .H file

```
HRESULT WINAPI WsCreateChannel(
__in WS_CHANNEL_TYPE channelType,
__in WS_CHANNEL_BINDING channelBinding,
__in_ecount_opt(propertyCount) const WS_CHANNEL_PROPERTY* properties,
__in ULONG propertyCount,
__in_opt const WS_SECURITY_DESCRIPTION* securityDescription,
__deref_out WS_CHANNEL** channel,
__in_opt WS_ERROR* error);
```

Figure 8

```
HRESULT WINAPI WsCreateChannel(
__in WS_CHANNEL_TYPE channelType,
__in WS_CHANNEL_BINDING channelBinding,
__in_ecount_opt(propertyCount) const WS_CHANNEL_PROPERTY* properties,
__in ULONG propertyCount,
__in_opt const WS_SECURITY_DESCRIPTION* securityDescription,
__deref_out WS_CHANNEL** channel,
__in_opt WS_ERROR* error)
{
//FUNCTION BODY - SOURCE CODE IMPLEMENTATION BY
DEVELOPER//
}
```

901

902

Source code .cpp file

Figure 9

```
#include <Precomp.h>
#include <WmiStr.h>
#include <EvnTrace.h>
#include <WebServices.h>
#include <WebServicesDebug.h>
#include <Api.h>
#include <Common.h>
#include <Tracing.h>
#include <List.h>
#include <ResourceString.h>
#include <WideString.h>
#include <ObjectGuard.h>
#include <Error.h>


HRESULT WINAPI WsTrace::CreateChannel(
    __in WS_CHANNEL_TYPE channelType,
    __in WS_CHANNEL_BINDING channelBinding,
    __in_ecount_opt(propertyCount) const WS_CHANNEL_PROPERTY* properties,
    __in ULONG propertyCount,
    __in_opt const WS_SECURITY_DESCRIPTION* securityDescription,
    __deref_out WS_CHANNEL** channel,
    __in_opt Error* error)
{
    Trace::ApiEnter(WS_TRACE_API_CREATE_CHANNEL);
    HRESULT hr = Ws::CreateChannel(channelType, channelBinding, properties, propertyCount, securityDescription, channel, error);
    return Trace::ApiExit(WS_TRACE_API_CREATE_CHANNEL, hr);
}

...
```

```xml
- <Api>
  <!-- Status codes --> ⎯1101
- <Error name="WS_S_ASYNC" severity="SEVERITY_SUCCESS" value="0" text="The function call is completing asynchronously."> ⎯1102  ⎯1103  ⎯1104
  - <Doc>
  - <p>
    A status return used to indicate that a function is completing asynchronously. See ⎯1105
    <a href="Async Model" />
    for more information.
    </p>
  </Doc>
  </Error>
- <Error name="WS_S_END" severity="SEVERITY_SUCCESS" text="There are no more messages available on the channel.">
  - <Doc>
  - <p>
    A status return used to indicate end of input has been reached. This is returned when there are no more messages available on a channel. See
    <a href="Channel Layer Overview" />
    for more information.
    </p>
  </Doc>
  </Error>
  <!-- Errors -->
- <Error name="WS_E_INVALID_FORMAT" severity="SEVERITY_ERROR" value="0" text="The input data was not in the expected format or did not have the expected value.">
  - <Doc>
    <p>This error is returned when the data being interpreted did not meet the expectations of the code that was interpreting it. It is used for any sort of mismatch between expectations and what was actually found: invalid xml, invalid wire protocol, incorrect format, xml not matching expected schema, etc. It is unlikely that retrying the operation will succeed.</p>
  </Doc>
  </Error>
```

```
<Function name='WsCreateChannel' type='HRESULT' group='Channel' trace='WS_TRACE_API_CREATE_CHANNEL' implemented='false'>
```

Figure 12

METADATA DRIVEN API DEVELOPMENT

BACKGROUND

During a software application development process, a plurality of artifacts may be produced when an application developer is building an application program interface (API). These artifacts may include a design document outlining a plan for building the API, documentation on the functionality of the API, header files, definition files, error messages, tracing information, security notes, example source code, etc. Because a design for the program source code usually changes during the course of the build process, these artifacts may become unsynchronized during the build out of the source code. However, it may be important to keep the artifacts synchronized with source code to prevent a misdirected build out based on outdated or conflicting artifacts. This synchronization may be complicated by a number of factors. Generally, artifacts may be produced at different times during the design and build process and keeping the artifacts consistent with each other may become increasingly difficult the more artifacts produced and the more complicated the API is designed.

SUMMARY

The described method and system synchronizes source code with byproducts or artifacts of an application creation process. The artifacts may include a design document, header files, definition files, error messages, tracing information, security notes, etc. The described method and system may be integrated into a development platform that is adapted to direct the user to perform particular revisions or updates to bring the source code in line with the artifacts.

DRAWINGS

FIGS. 7A-7C illustrate portions of an XML specification 700 using an exemplary specification grammar;

FIG. 8 illustrates a function prototype or declaration that may be found in a header file;

FIG. 9 illustrates an example source code for a function shell;

FIG. 10 illustrates a wrapper function implementation;

FIG. 11 illustrates an embodiment of grammar that may be used to describe and list error messages; and FIG. 12 illustrates specification grammar for designating an function implemented status.

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
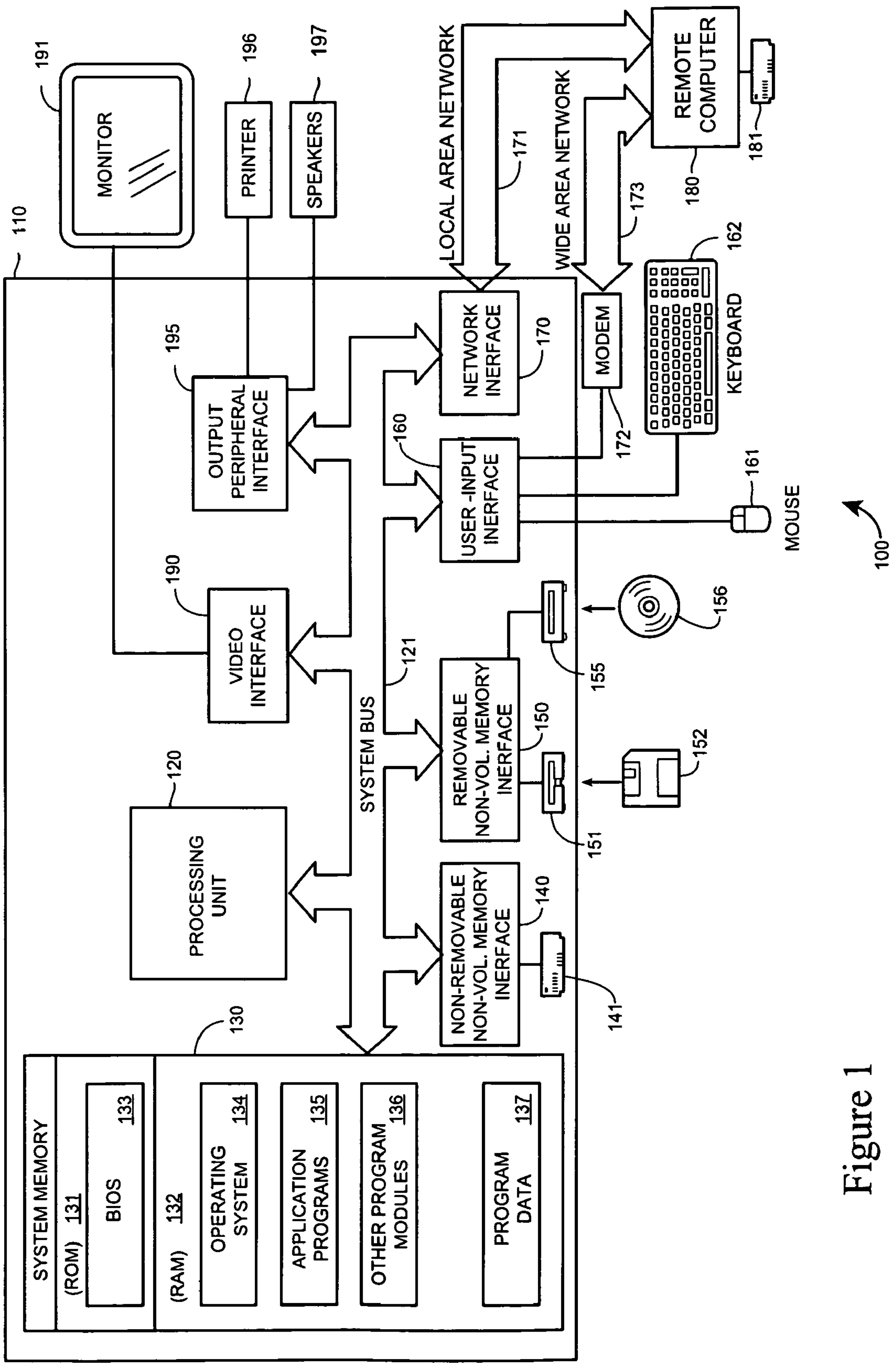
FIG. 1 illustrate block diagrams of a computing system that may operate in accordance with the described embodiments.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to a optical disk 156.

The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
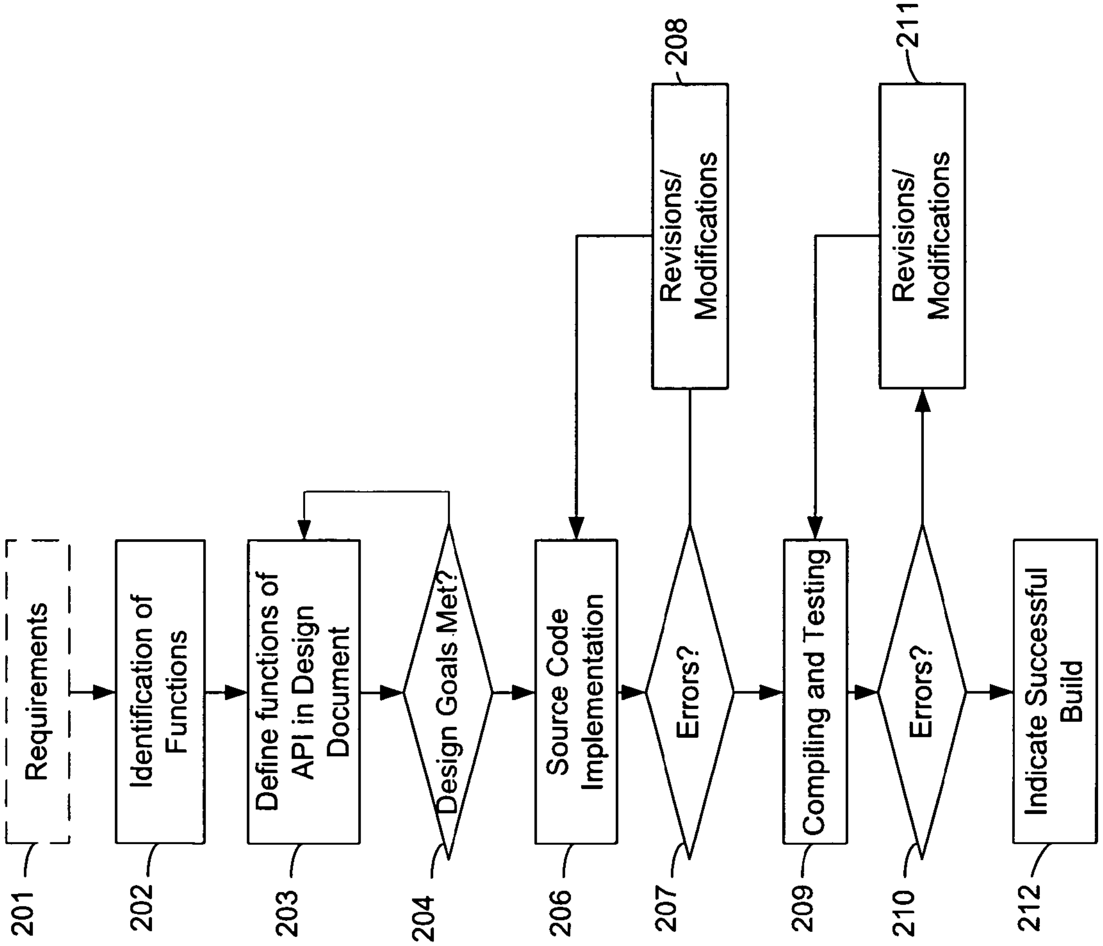
FIG. 2 illustrates a general design and build process for an application.

FIG. 2 illustrates an existing design and build process for a software application. Generally, design and build of a software application is an iterative process involving frequent changes and modifications in each block of the process. A developer or team of developers may begin the application creation process by gathering requirements 201 for the application. The requirements may then be used to identify a set of functions of an application programming interface (API) 202. The gathering and identifying may then be used to create a design document that outlines the purpose of the software application and then begins to define a set of application programming interfaces (APIs) 203. The design document may include a categorization of the broad functional categories of the APIs provided by the application and eventually a description of the operations of the functions of each API. This design document may be called a design specification, code specification, or simply a specification.

Generally, a design document embodying the design specification may be continually modified to reflect different (e.g., improved) ways of providing the functionality defined by the goals of the software application. For example, after an iteration of the design document, the design document may be reviewed to determine whether a current design meets the intended goals of the API or set of APIs 204. Alternatively, the design document may be reviewed based on changes to software goals. If the design document does not meet the design goals at block 204, the design document may be revised with new functional descriptions at block 203. Developers may agree at some point that the design document is adequate enough to initiate source code implementation, or in other words, the developers may agree that a source code writing process may begin 206 based on the design reflected by the specification. In computer science, source code (commonly just source or code) is any sequence of statements or declarations written in some human-readable computer programming language. The source code which constitutes a program may be held in one or more text files.

Generally, source code is written in parts based on the design document. As each part is written, errors in the design may be discovered at block 207 prompting revisions in the code 208. These design changes, however, are rarely reflected back in the design document or specification. In other words, fixes/changes/modifications may be made to source code without a corresponding update of the design document. It should be noted that these errors in the source code may be detected during writing of the code before any compilation is executed. For example, methods may be written only to realize that the operations are not useful or may be best incorporated in a manner different than what is outlined in the design document.

After the source code is written, a build phase may commence in which the source code is compiled 209. Compilation is the translation (usually using a compiler program) of source code into another computer language (a target language). The original sequence is usually called the source code and the output called object code. "Compilation" and "build" may be used interchangeably. Errors may be detected during compilation 210 which may prompt revisions to the source code 211. The compilation of a portion of code may be independent of other parts of the application (e.g., other APIs). Revisions to the source code 211 during a compilation stage may prompt alteration in the operation of some of the functions described in the original specification document. For example, while existing design goals of the specification are met by a current version of source code, different structures or functions may be implemented from those in the design document causing a disconnect between the source code and specification.

Eventually, a satisfactory build and design may be created and delivered at block 212. A problem with this existing application creation process is that because each process block is iterative and each process block may rely or depend on the results of previous process blocks (e.g., artifacts), unsynchronized artifacts of the build process may magnify even small coding errors or deviations. For example, given that a portion of an API does not compile, a developer may look to correct the source code in a number of places. The developer may rely on other portions of written source code or artifacts such as the specification. If the specification is not synchronized the developer may write bad code in one portion of code that negatively impacts other portions of code (e.g., causing other code to produce errors). For example, if the developer relies on a second portion of source code based on one version of the specification to write a first portion of source code and the second portion is not synchronized, then the first portion may be written incorrectly, thereby causing debugging to be complicated.

Maintaining the correspondence between source code and artifacts may not be an easy task. Because of the large number of artifacts that may be produced and the ever increasing complexity of the APIs, synchronizing source code with artifacts may be arduous and time consuming. Moreover, developers working against a tight deadline may not be motivated to update artifacts that are not immediately pertinent to their area of the source code (e.g., a current portion of the source code which a developer is writing). In these situations, once a non-source code artifact (e.g., the design document) is created, updates are rarely performed to that artifact.

To further complicate synchronization of artifacts, certain artifacts such as header files, error handling methods, tracing methods, etc., may be created at different times during a build out process. It may be easy to leave some artifacts unaccounted for during synchronization. Unfortunately, since the artifacts may generally rely on or be dependent on one or more other artifacts, one out-of-synch artifact can lead to a very complicated debugging process. In other words, reliance on one or more inconsistent artifacts during the application building or creation process may promote errors in the write and build process that may waste developer time.

Figure 3A:
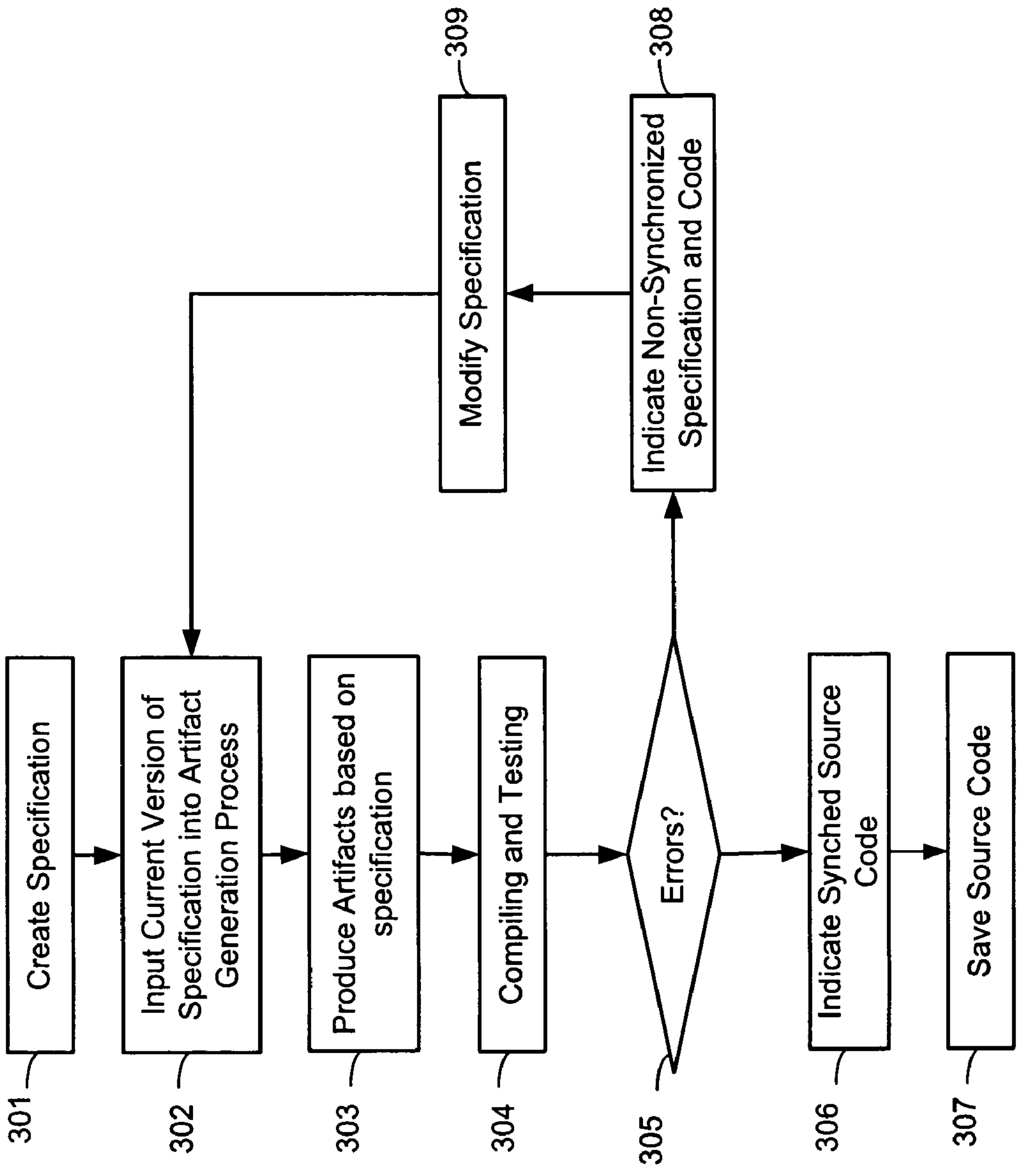
FIG. 3A illustrates a process embodiment using an artifact generation tool.

FIG. 3A illustrates an embodiment of a process for synchronizing a set of program artifacts with source code. In a beginning stage of a development process, before source code is written or implemented, a developer may begin to create a specification of the design 301 of an application. This design may be written using a markup language such as XML. Any available editing tool may be used to write the XML. The grammar of the specification may be defined, however, as a particular set of parameters and relations between parameters. In a markup language such as XML, the parameters may be designated using header designations as known by those skilled in the art. An example of a type grammar that may be used for one embodiment is illustrated in FIGS. 7A-7C (to be discussed further below).

FIG. 3A illustrates that the specification may then be inputted into a generation tool 302 and the generation tool may be executed 303 on the specification. The generation tool may be a command line tool which is fed the specification file (which may be an XML file adhering to the grammar described above) as an input. The generation tool may be programmed to generate a plurality of artifacts based on the specification 303 including one or more of the following: a header file with definitions for the public API; an HTML documentation; a definition file used to indicate the exported symbols for a dynamic link library (DLL); a resources file used to build the resources of the DLL; and one or more template source files including source code related to error handling/messaging, tracing, and other structural components.

It should be noted that this general listing of artifacts is not exhaustive. Other artifacts known to those skilled in the art may also be produced by the generation tool based on a specification that contains the grammar to describe the other artifacts. Moreover, some or all of the artifacts may be produced for a particular iteration based on various conditions or parameters. For example, the set of artifacts may be selected for generation by a user of the generation tool.

The generated source code headers and other source code artifacts may be inputted into a general compiler after they are produced at block 304. In computer programming, particularly in the C and C++ programming languages, a header file or include file is a file, usually in the form of source code, that is automatically included in another source file by the compiler. After the compiler is executed on the source code, compiler errors may be detected at block 305. If there are no compile errors, then the source code and specification may be synched 306 and the compiled source code may be saved 307. If there are compile errors detected at 305, this may indicate that the source code and specification may not be synchronized. This indication may be displayed to a user at block 308.

The described process may ensure that source code and documentation are synchronized by requiring that header files be generated based on the specification and that these header files be used in the compilation and build of the source code. Any inconsistencies between the specification and source code may result in an error of the compiler that may specifically point to the header file and/or function implementation that is causing the error. The compiler error and/or indication may prompt or direct the user to fix the specification 309 to bring the specification in line with the code. This direction of fixing the specification may be a general process where the source code is assumed to represent a more current or correct version of the application design. In alternative embodiments, the source code may be modified or aligned to the specification at block 309.

Figure 3B:
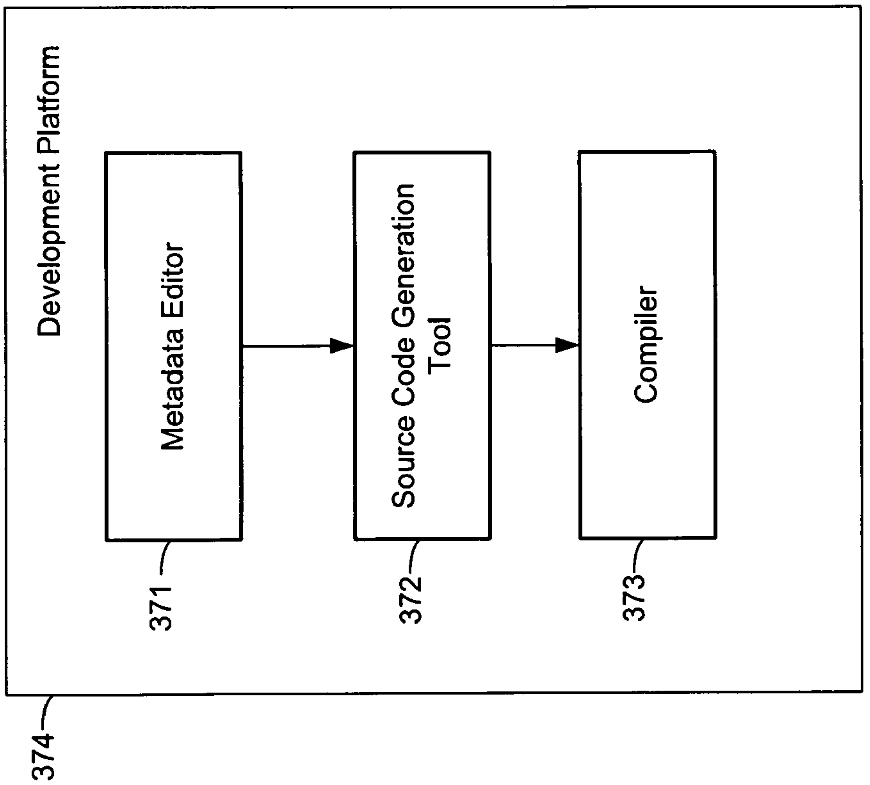
FIG. 3B illustrates a system which may be used to implement the above described process.

FIG. 3B illustrates a system which may be used to implement the above described process. In particular, a metadata editor 371 may be used to generate a specification. As discussed above, the metadata editor may be an XML editor. After a specification is generated, a source code generation tool 372 may be used on the specification to generate artifacts, some of the artifacts including source code (e.g., source code headers). Source code including the artifact source code may then be compiled using a compiler 373. Each of the components 371-373 may be individual devices or programs or may be integrated as a development platform 374. Components 317-374 may be implemented as part of a computing apparatus or system as illustrated in FIG. 1.

Figure 4:
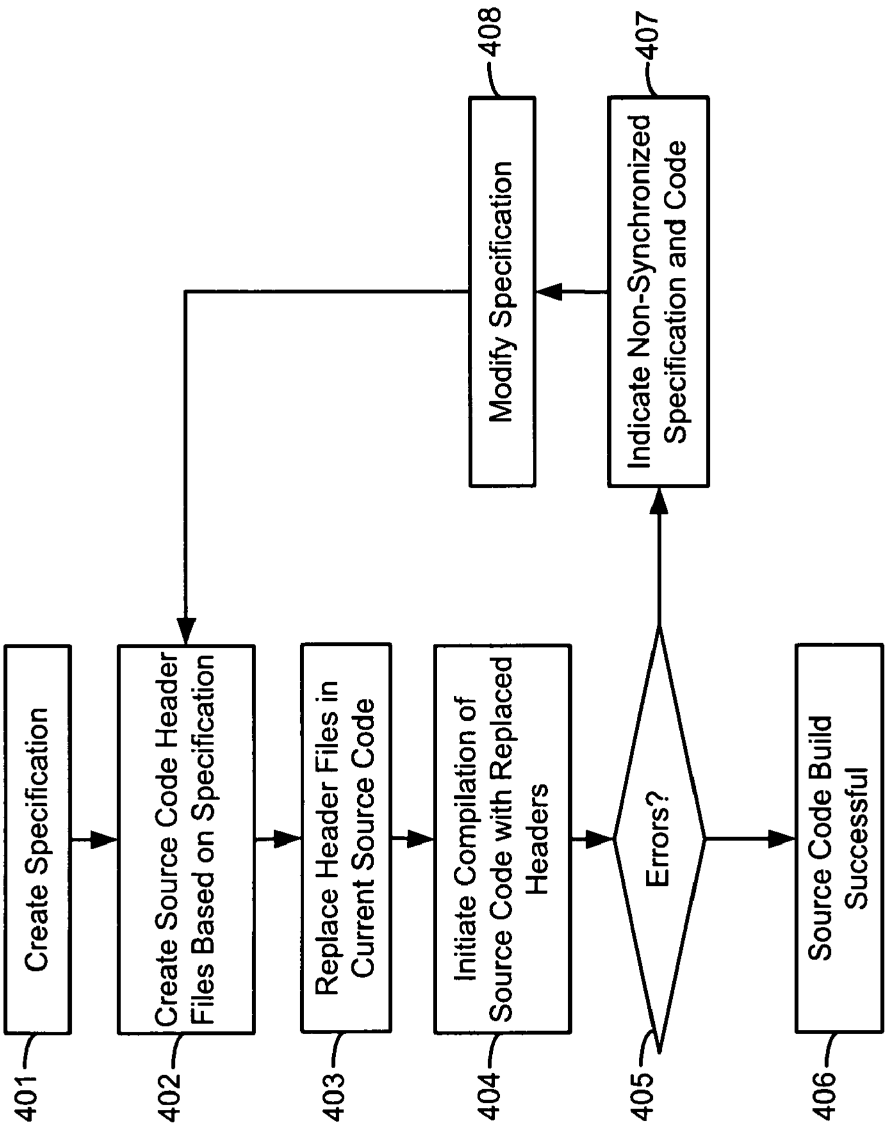
FIG. 4 illustrates a detailed process in which a code generation tool may produce at least a set of headers used to synchronize source code.

FIG. 4 illustrates a detailed embodiment in which the code generation tool may produce at least a set of source code headers that are compilable, where the set of source code headers, or header files, are based on an inputted specification. In this embodiment, a specification may be created 401 as described above. A set of compilable header files may be generated based on the specification 402. The header files may be automatically generated using a generation tool as described above. Existing header files (if any) for a current version of source code may be replaced with the newly generated headers 403. In some embodiments, the generation tool and/or development platform may be adapted to automatically replace the function signature of the source code based on the newly generated header files. This replacement may be done without changing the code contained in a function implementation. In this case, when a compilation error occurs, the developer may be directed to fix a clearly marked function whose source code implementation needs to be changed (e.g., the function code in the function body may need to be modified to correspond with the function signature). In this embodiment, the developer does not need to replace function signatures. The developer may simply assume that the function signatures are correct and that only the function implementation needs to be modified, thereby saving time when debugging (e.g., a system).

The newly generated header files and existing source code may then be compiled 404. If no errors are detected from the compilation at block 405, the source code may be successfully built and compiled 406. Assuming that a previous version of the source code was compilable, any errors detected at block 405 from the build using the newly generated headers may indicate a unsynchronized specification 407. This indication may prompt the developer to modify the specification at block 408. New headers may be generated 402 for a second iteration of the process. In an alternative embodiment, the compilation errors may be eliminated by modifying the source code instead of the specification to synchronize the code with the specification. The particular fix may be based on a particular programming situation. For example, when the design is considered primary to the source code, the latter embodiment may be used. In situations in which the source code is primary (e.g., the source represents an improved design and better functionality) the former embodiment may be applied.

In one embodiment, the generation tool may be adapted to synchronize all other artifacts based on the header files. In other words, the header files may be the base artifact which is used to detect/determine synchronization with current source code and all other artifacts may be written based on the header files. In other embodiments, a different artifact may be used as a base for artifact synchronization.

Figure 5:
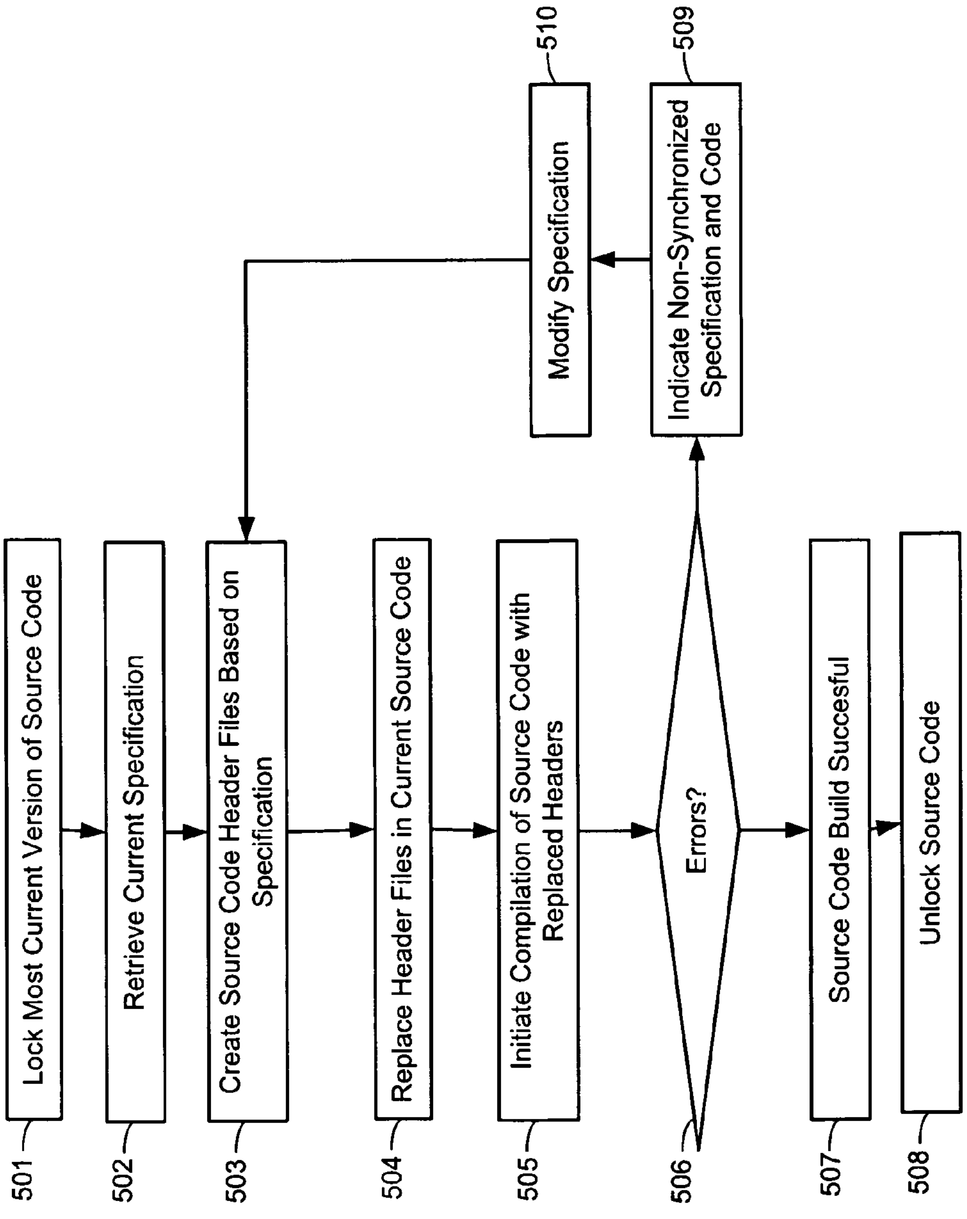
FIG. 5 illustrates that a development platform that directs a user to update a specification to match a current version of source code.

In alternative embodiments, a development platform may integrate one or more of the above-described processes to direct a development process. FIG. 5 illustrates that a development platform may be adapted to lock the source code against modification during a testing process, thereby ensuring synchronization in a particular direction (e.g., towards modifying the specification). In particular, source code may be locked against developer modification at block 501. This source code may represent the most recent version of the source code that was successfully compiled or that is compilable. A current version of the specification may be retrieved at block 502 and the generation tool may be executed on the specification to produce a set of header files based on the inputted specification 503. In this embodiment, the generation tool may be implemented as part of the development platform that may replace existing headers of source code with the newly generated headers based on the current specification 504. The development platform may unlock the code as necessary to perform this replacement (not illustrated). After replacing the header files, the source code including the new header files may be run through a compiler 505. If no errors are detected at block 506, an indication of a successful build may be displayed 507. This may indicate that the source code is currently synchronized with the specification and the source code may then be unlocked 508. If errors are detected at 506, this may indicate that that specification is not synched with the source code 509. Because the source code is locked by the development platform, the developer may be directed to modify or update the specification 510 and repeat the process at block 503 until the compilation process is successful. There may be times in which the source code is more desirable than the version of the design described by the specification. The development platform may provide an override for removing the source code lock for these situations.

Figure 6:
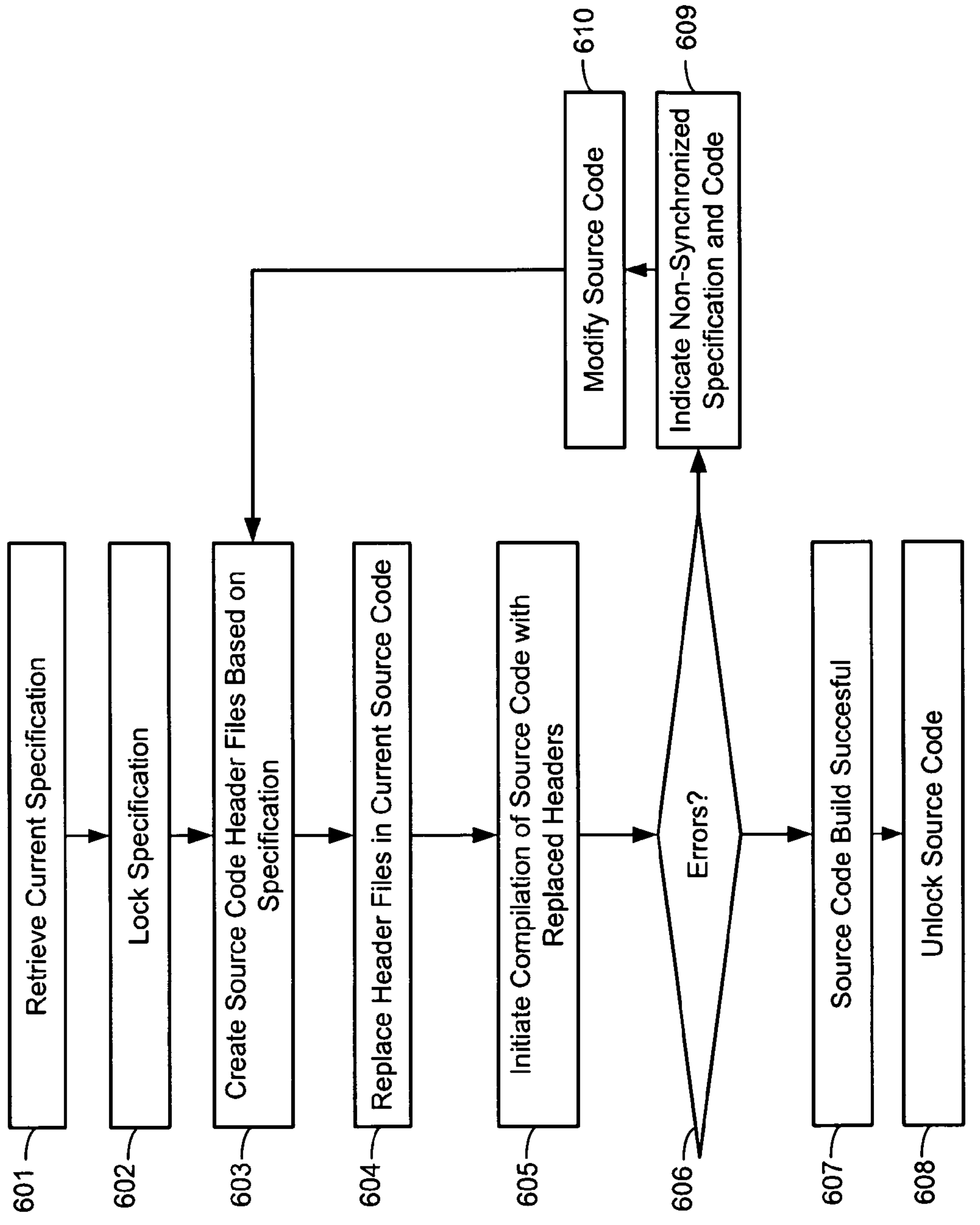
FIG. 6 illustrates that a development platform that directs a user to update source code to match a current version of a specification.

FIG. 6 illustrates a process embodiment of an integrated development platform in which the developer is directed to change the source code instead of the specification. In this embodiment, the specification may be retrieved 601 and locked 602. The specification may be inputted into a generation tool integrated into the development platform to generate source code header files 603 based on the specification. The header files in the current source code may then be replaced with the newly generated header files 604. The source code with the replaced header files may then undergo a compilation process 605. If no errors are detected from the compilation process at block 606, the source code may compile successfully and cleanly 607. This may indicate that the source code is currently synchronized with the specification and an appropriate display may show this indication. The source code may then be unlocked at block 608. If there are errors detected at 606, an indication that the specification is not synched with the source code may be displayed 609. Because the specification is locked by the development platform, the developer may be directed to modify or update the source code and repeat the process at block 610 until the compilation process is successful.

Grammar and Artifacts

FIGS. 7A-7C illustrate portions of an XML specification 700 using an exemplary specification grammar. The specification grammar may be considered metadata describing source code, where metadata is generally defined to be data describing data. The specification portion illustrated in FIG. 7A may describe an API using a group name 701, which may be the API name, and a summary or description of the API 702. A portion of the specification 700 illustrated in FIGS. 7B-7C describe a function of the API. In particular, the specification portion of FIGS. 7B-7C may use grammar to described a function WsCreateChannel that is part of the API.

A function signature for the function WsCreateChannel is described by a name of the function 710, a function result type 711, a function group 712 (e.g., a set of APIs), function parameters 714. A function prototype or signature is a declaration of a function that omits the function body but does specify the function's name, arity, argument types and return type(s). In one embodiment, the grammar may include an end-user friendly name 715 and/or description of the parameter 716 in addition to a parameter type 717. The end-user description may be considered a translation of the parameter. The grammar may also include parameters providing a description of different parts of the function. For example, the grammar may include parameters designating the type of a parameter as input type 718 or result/out type 719 (see FIG. 7C). The grammar may include a summary of the nature and general operation of the function 721. The grammar may also include remarks on the function 722. In some embodiments, the grammar may require a specific sequence for the set of parameters or designations.

Appendix A illustrates an HTML file showing documentation for the function WsCreateChannel which may be automatically generated from the specification of FIGS. 7A-7C using a particular document format. The HTML file may be formatted to be easy to read by an end-user. For example, all the parameter values in the specification may be used to construct an easily recognizable function signature as illustrated in Appendix A. The format may be tailored based on user preference. The format may be based on the grammar of the specification. For example, the grammar may provide indicators describing how the HTML file is constructed and formatted.

The HTML documentation may be include a plurality of pages that are linked by hyperlinks and the documentation may include linked descriptions of the functions and its characteristics. For example, the documentation may be organized so that there is a page per function, type, etc., with hyperlinks between the types of fields, parameters, etc. An embodiment of a html documentation that may be generated by the generation tool. In one embodiment, the generation tool may also generate summary pages (that may list all the functions and list functions by "group"). The listed functions may reference independent HTML pages.

FIG. 8 illustrates a function prototype or declaration that may be found in a header file. A header file containing a plurality of such function prototypes may be generated by the generation tool. Generally, a C or C++ language header file may be designated with a .H file extension.

FIG. 9 illustrates an example source code shell (or stub) for a function. This function includes both the function signature 901 and a function body 902. In FIG. 9, the function body has not been written. This source code may be considered a shell of the function. It should be noted, however, that this shell code is compilable. Thus, when the generation tool generates a set of sample source function shells based on a specification, even though the functions have not been implemented, the functions can be compiled without error. Alternatively, if the function is not implemented yet, then the function body may be written to return an error (e.g., an error referred to as return E_NOTIMPL) indicating that the function is not implemented yet.

Tracing Parameter

FIG. 7B illustrates a tracing parameter 730 that may be designated by the specification to enable automatic tracing for a function. The process of tracing may involve source code that logs or displays markers indicating a location of program execution or program flow. Tracing may be used to track program or instruction execution during a debugging stage to determine the operation of a function or determine the source or location of an error. The parameter "trace" 730 may be used to designate that tracing is enabled for a function. In one embodiment of grammar, tracing may be disabled for a function unless the "trace" parameter is designated in the function metadata (specification). As illustrated in FIG. 7B, the tracing parameter 730 is designated a value indicating a tracing function identifier and indicating that tracing is enabled. When the generation tool detects the trace function designated, the generation tool may automatically generate a wrapper function including the code for implementing tracing. FIG. 10 illustrates a wrapper function implementation. A wrapper 1001 of a primary function (WsCreateChannel) may be an ancillary function that calls the primary function. As illustrated in FIG. 10, the wrapper function may be named similar to the primary function (e.g., WsTrace::CreateChannel). The wrapper 1001 may include additional implementation code applied to the primary function without being included in the primary function implementation. As illustrated in FIG. 10, the generated tracing wrapper 1001 may include calls to tracing functions 1002 that may be applied to the primary function. It should be noted that, in a build of the source code, the wrapper may be and often times is separate from the actual developer code for the primary function when tracing is activated. The generation tool may also generate the component tracing code in other parts of the source code, such as the header file, related source files, etc. As discussed, the wrapper includes a call the actual source code implementation of the primary function 1003 that contains the developer's source code implementation for the primary function. In one embodiment, the generation tool may default to building shell wrappers that only contain a call to the primary function for each primary function in the source code regardless of whether tracing is enabled for any function. In this manner, whenever tracing is enabled, the generation tool may simply need to activate an already built wrapper (e.g., by adding the tracing functions in the wrapper).

Error Message Designation

FIG. 11 illustrates an embodiment of grammar that may be used to describe and list error messages that may be produced by functions of an API. The grammar may include an error name 1101, a severity indicator 1102, a value 1103, and a text description 1104. The error grammar may include descriptions of the error (which may be used to generate the html documentation described above). In one embodiment, the error messages may be coded to reflect system parameters or other parameters of related functions/APIs.

In one embodiment, an error reporting implementation may be automatically provided by the generation tool for each function. For example, the generation tool may automatically generate the error reporting implementation as source code for each function. FIG. 7C illustrates a portion of specification 740 that describes error handling for the function WsCreateChannel. Automatic generation of error handling source code may save a programmer time in having to implement the code. In particular, the grammar allows a developer to designate a set of error messages 742 for a particular function where the generation tool will generate a wrapper to include error reporting functions that identify and display the error messages.

In one embodiment, a single wrapper may be used to implement both the tracing code and error handling code. In some embodiments, different wrappers may be used, where the wrappers may reference each other and may be sequenced in a particular manner depending on the type of tracing and error handling. In one embodiment, only certain error handling and tracing may be used in combination and in a particular sequence. This may help to simplify the build of the generation tool.

Parameter Value Lookup Function

Among the artifacts that the generation tool may produce is a source code file (or a portion of a source code file) used to provide or allocate typed values for dynamically replacing parameters with a typed set (e.g., strings) from the resources section of the DLL. In particular, a class is generated with a method that retrieves a resource string. Appendix B illustrates an example error string file that is reference by a class to retrieve strings for error functions. The class may be implemented as a private method. The methods of the class may correspond to resource string names. Each method may return typed parameter values which correspond to the replacement parameters. Calling the method may load the string and replace the supplied parameters in placeholders with values from the resources.

This may be used, for example, with the error message designations when the error messages depend on parameter values external to the message handling routine or function for which the error handling routine is being implemented for.

Automatic Replacement of Function Signature

As discussed above, the function signatures of the actual function implementation in the source code may be automatically replaced by the generation tool when it operates on the specification. In embodiments where the developer has not written any defining code for a function (i.e., the function has not been implemented), the specification grammar may allow an "implemented" parameter to designate that the function has not been implemented, as illustrated in FIG. 12. When the function has been written (e.g., when the developer has written source code into the body of a function), then an implemented parameter 1201 may have a value indicating this. This parameter may be checked in some embodiments to determine whether the function signature may be automatically replaced during an execution of the generation tool. For example, in one embodiment, when the developer has implemented a function and the implemented parameter is true, then the generation tool may not replace the header. This may be used to prevent the possibility of erasing or deleting an implementation of the function. This may be the case in embodiments in which the generation tool is programmed to replace an entire function with a function shell (e.g., consisting of just a function signature and an empty function body) Alternatively, as discussed above, the generation tool may be programmed to only replace the function signature without altering or deleting the function body, in which case the implemented parameter may not be needed.

Due to the fact that many of the files are generated during the build out process, the following constraints may be enforced by the described system. The source code which may be used to generate the header and source files (e.g., in C language) may need to be in synch or a compile error may result. This means that an implicit contract (synchronization) between the public API (source code) and documentation may need to be enforced or the code may not compile or build. If a new replacement parameter is added for a particular resource string, or a resource string has been accidentally deleted even though some source code still references the resource string, then a compile time error may result.

The invention claimed is:

1. A method of synchronizing documentation of generated program code with source code comprising:

providing a specification for an application programming interface (API) using a mark-up language with a predefined grammar;

designating a set of functions of the API in the specification;

designating a set of operational descriptions corresponding to each function in the specification;

designating a listing of parameters of each function in the specification;

designating a description of each parameter of each function in the specification;

designating an implementation status of each function in the specification;

designating a set of error messages of each function in the specification;

designating a tracing indication of each function in the specification;

designating at least one relation between functions or parameters in the specification;

inputting the specification into a source code generation tool to generate a plurality of artifacts;

generating from the source code generation tool a Hypertext Markup Language (HTML) documentation describing each function and each parameter of each function of the API;

generating from the source code generation tool a set of compilable source code header files including declarations of each of the API functions designated by the specification;

generating from the source code generation tool a set of source code method stubs for API function implementation;

generating from the source code generation tool a set of wrapper functions corresponding to at least a subset of the API functions, wherein a wrapper contains program code that provides support operations separate from operation implemented by each API function and wherein the wrapper includes a call to a corresponding API function; and running, on a processor, a compiler on generated source code sequentially after generating the source code to determine validity of the source code and synchronization of the source code with the specification.

2. The method of claim 1, further comprising modifying a design of a target API function by updating the specification and running the source code generation tool after a prior run to generate a second set of headers, and replacing the previously generated set of headers with the second set of headers for compilation by the compiler.

3. The method of claim 1, wherein the source code generation tool is adapted to determine whether a target function of the specification is designated as implemented and adapted to replace a signature of the target function during stub generation without modifying an existing source code implementation when the target function is designated as implemented.

4. The method of claim 1, wherein the markup language is eXtensible Markup Language (XML) and the predefined grammar comprises a fixed set of XML headers and a sequence for the fixed set of XML headers.

5. The method of claim 1, wherein the HTML documentation comprises a plurality of HTML pages wherein each page presents a name of a function, a summary description of an operation of the function, a listing of descriptions of each parameter of the function, and a description of error messages of the function.

6. The method of claim 5, wherein the HTML documentation further includes a link to related functions and related parameters of each of the set of API functions.

7. The method of claim 1, wherein the source code generation tool further generates a dynamic link library (DLL) definition file for registering function symbols used by the API and for linking a set of files for compilation of the DLL.

8. The method of claim 1, further comprising automatically generating by the source code generation tool an error handling function that is called from the wrapper to handle errors designated by the specification.

9. The method of claim 1, further comprising automatically generating tracing code that is used to track instruction execution flow, wherein the tracing code is included in the wrapper for tracing program execution through the function.

10. The method of claim 1, further comprising generating a source file which defines a replacement value method that operates to retrieve resource strings, and automatically incorporating the replacement value method in a function of the API that requires dynamic resource string allocation for a parameter of the replacement value method.

11. The method of claim 10, further incorporating the replacement value method in an error message description wherein the error message requires dynamic resource string allocation.

12. A system for synchronizing documentation of generated program code with source code comprising:

one or more processing units coupled to one or more memories to provide:

an editor for generating a specification document indicating a set of functions of an application programming interface (API), a set of operational descriptions corresponding to each function, a listing of parameters of each function, a description of each parameter of each function, an implementation status of each function, a set of error messages of each function, a tracing indication of each function, and relations between functions or parameters, wherein the specification document is written using a markup language and a predefined specification grammar;

a code generation application that receives the specification document as an input and outputs a set of artifacts, the artifacts including Hypertext Markup Language (HTML) documentation describing each function and each parameter of each function of the API and the source code including a set of compilable header files including declarations of each of the API functions designated by the specification document, a set of method stubs for API function implementation, and a set of wrapper functions corresponding to at least a subset of the API functions, wherein a wrapper contains program code that provides support operations separate from operations of each API function and wherein the wrapper includes a call to a corresponding API function; and a compiler that compiles the code generated by the code generation application, wherein the system is adapted to require the code generation application to execute before the compiler builds the code.

13. The system of claim 12, wherein the markup language is eXtensible Markup Language (XML) and wherein the editor is an XML editor programmed to format the specification document to include a fixed set of XML headers in a particular sequence.

14. The system of claim 12, wherein the code generation application is adapted to determine whether a function of the specification document is designated as implemented and is adapted to forego generation of a method stub for that function when the function is designated as implemented.

15. The system of claim 12, wherein the code generation application is adapted to determine whether a target function of the specification document is designated as implemented and adapted to replace a signature of the target function during stub generation without modifying an existing source code implementation when the target function is designated as implemented.

16. The system of claim 12, further comprising generating a source file which defines a class that retrieves resource strings, and automatically incorporating the class in a method of one of the API functions that require dynamic resource string allocation for a parameter of the method.

17. A computing device comprising:

a display unit that is capable of generating video images;

an input device;

a processor operatively coupled to the display unit and the input device, the processor being programmed to:

create a specification document containing a set of functions of an application programming interface (API) using a mark-up language with a predefined grammar;

designate a set of operational descriptions corresponding to the set of functions in the specification document;

designate a listing of parameters of the set of functions in the specification document;

designate a description of each parameter of each function of the specification document;

designate an implementation status of each function of the specification document;

designate a set of error messages of each function of the specification document;

designate a tracing indication of each function of the specification document;

designate at least one relation between functions or parameters of the specification document, wherein the specification document is written using the markup language and a predefined specification grammar;

lock one of the specification document or source code from being modified;

input the specification document into a source code generation tool to automatically generate a plurality of artifacts;

generate by the source code generation tool Hypertext Markup Language (HTML) documentation describing each function and each parameter of each function of the API;

generate by the source code generation tool a set of compilable source code header files including declarations of each of the API functions designated by the specification document;

generate by the source code generation tool a set of method stubs for API function implementation;

generate by the source code generation tool a set of wrapper functions corresponding to at least a subset of the API functions, wherein a wrapper contains program code that provides support operations separate from operations of each API function and wherein the wrapper includes a call to a corresponding API function;

replace a portion of an existing version of source code with corresponding source code generated by the source code generation tool to result in a modified version of source code;

compile the modified version of source code, wherein the processor is programmed to require the code generation tool to execute before the compiler builds the code.

18. The computing device of 17, wherein the processor is programmed to execute the source code generation tool followed by executing the compiler a first time based on a first specification document and to execute the source code generation tool followed by executing the compiler a second time when a function is modified in the first specification document.

19. The computing device of claim 17, wherein the processor is further programmed to automatically generate, using the source code generation tool, an error handling function that is included in the wrapper to handle errors designated by the specification document.

20. The computing device of claim 17, wherein the processor is further programmed to automatically generate tracing code that is used to track instruction execution flow, wherein the tracing code is included in the wrapper for tracing program execution through the function.

* * * * *